US006572932B2

(12) United States Patent
Sigel et al.

(10) Patent No.: US 6,572,932 B2
(45) Date of Patent: Jun. 3, 2003

(54) PROCESS FOR PROVIDING A GLOSS CONTROLLED, ABRASION RESISTANT COATING ON SURFACE COVERING PRODUCTS

(75) Inventors: Gary A. Sigel, Lancaster, PA (US); Jeffrey S. Ross, Lancaster, PA (US); Elizabeth A. Malkowski, Lancaster, PA (US); Richard E. Herr, Jr., Lancaster, PA (US); Larry W. Leininger, Akron, PA (US)

(73) Assignee: AWI Licensing Company, Wilmington, DE (US)

( * ) Notice: Subject to any disclaimer, the term of this patent is extended or adjusted under 35 U.S.C. 154(b) by 0 days.

(21) Appl. No.: 10/062,616

(22) Filed: Jan. 31, 2002

(65) Prior Publication Data

US 2002/0120030 A1 Aug. 29, 2002

Related U.S. Application Data

(62) Division of application No. 09/363,914, filed on Jul. 28, 1999, now abandoned.

(51) Int. Cl.[7] ............................... C08J 7/04; C08J 7/18; C08F 2/48
(52) U.S. Cl. ...................... 427/510; 427/508; 427/514; 427/519; 522/8; 522/46; 522/83; 522/93; 522/97; 522/107
(58) Field of Search .......................... 522/42, 46, 44, 522/64, 18, 8, 83, 107, 93, 97; 427/508, 510, 514, 519

(56) References Cited

U.S. PATENT DOCUMENTS

| 3,658,620 A | 4/1972 | Hall ........................... 156/272 |
| 3,785,850 A | 1/1974 | Parker ..................... 117/93.31 |
| 3,924,023 A | 12/1975 | Boranian et al. ............. 427/54 |
| 4,048,036 A | 9/1977 | Prucnal |
| 4,100,318 A | 7/1978 | McCann et al. ............ 428/159 |
| 4,113,894 A | 9/1978 | Koch, II ....................... 427/44 |
| 4,139,299 A | 2/1979 | Bolgiano ............... 204/159.16 |

(List continued on next page.)

FOREIGN PATENT DOCUMENTS

| CA | 1127022 | 7/1982 | .................. 117/126 |
| EP | 0494658 A2 | 1/1992 | ........... B24D/3/28 |
| GB | 2020998 A | 5/1979 | ........... B32B/27/30 |
| GB | 2182337 A | 10/1986 | ........... C08L/61/28 |
| GB | 2310815 A | 3/1997 | ........... B32B/27/08 |
| JP | 2-105470 | 10/1990 | |
| WO | WO 93/05227 | 9/1992 | ............ D06N/3/08 |

OTHER PUBLICATIONS

Advertisement from Energy Sciences, Inc. entitled "Electron Beam Basics" (1995).

(List continued on next page.)

Primary Examiner—Susan W Berman
(74) Attorney, Agent, or Firm—Womble Carlyle Sandridge & Rice, PLLC

(57) ABSTRACT

The invention comprises a composition and method for controlling the gloss of surface covering products through curing of the composition to create a wearlayer surface, and preferably on a floor covering product. The surface covering product preferably is prepared by application of an aromatic polyester acrylate composition including a flatting agent and/or hard particles, and at least one free-radical generating compound to a substrate, and then the coating is partially cured by exposure to low peak irradiance UV light in either ambient or inert air, followed by fully curing the coating with high peak irradiance UV light in preferably an inert atmosphere to form a low gloss abrasion resistant wearlayer surface. Alternatively, a high gloss wearlayer surface is obtained by solely exposing the preferred composition to high peak irradiance UV light in ambient atmosphere. Furthermore, a differential gloss flooring product is obtained by using the present inventive method described herein.

15 Claims, 2 Drawing Sheets

U.S. PATENT DOCUMENTS

| | | | |
|---|---|---|---|
| 4,169,167 A | 9/1979 | McDowell | 427/54 |
| 4,170,663 A | 10/1979 | Hahn et al. | 427/44 |
| 4,210,693 A | 7/1980 | Regan et al. | 428/152 |
| 4,289,798 A | 9/1981 | Bagley et al. | 427/39 |
| 4,303,695 A | 12/1981 | McCann et al. | 427/44 |
| 4,309,452 A | 1/1982 | Sachs | 427/44 |
| 4,313,969 A | 2/1982 | Matthews et al. | 427/44 |
| 4,393,187 A | 7/1983 | Boba et al. | 528/60 |
| 4,395,452 A | 7/1983 | Scher et al. | 428/148 |
| 4,405,657 A | 9/1983 | Miller, Jr. et al. | 427/54.1 |
| 4,418,109 A | 11/1983 | Miller, Jr. et al. | 428/142 |
| 4,421,782 A | 12/1983 | Bolgiano et al. | 427/53.1 |
| 4,491,616 A | 1/1985 | Schmidle et al. | 428/158 |
| 4,508,750 A | 4/1985 | Föll et al. | 427/44 |
| 4,781,987 A | 11/1988 | Bolgiano et al. | 428/424.6 |
| 4,880,689 A | 11/1989 | Park et al. | 428/143 |
| 4,971,855 A | 11/1990 | Lex et al. | 428/206 |
| 5,003,026 A | 3/1991 | Ehrhart et al. | 528/49 |
| 5,401,560 A | 3/1995 | Williams | 428/143 |
| 5,545,476 A | 8/1996 | O'Dell et al. | 428/327 |
| 5,585,415 A | 12/1996 | Gorzalski et al. | 522/18 |
| 5,719,227 A | 2/1998 | Rosenberry et al. | 524/590 |
| 6,333,076 B1 * | 12/2001 | Sigel et al. | 427/493 |
| 6,440,500 B1 * | 8/2002 | Sigel et al. | 427/494 |

OTHER PUBLICATIONS

Advertisement from Radtech International North America entitled "It's Quite Possible That You've Never Seen Light Used So Many Ways Before." (1995).

Advertisement from Energy Sciences, Inc. entitled "Safe Processing with Electrocure™ Electron Beam Curing Systems" (1995).

Official Patent Abstract of Japanese Application No. 02105470.

Patent Abstract Japanese Application No. 105470, Derwent Publications LTD. (1992).

* cited by examiner

PROCESS FOR PROVIDING A GLOSS CONTROLLED, ABRASION RESISTANT COATING ON SURFACE COVERING PRODUCTS

CROSS REFERENCE TO RELATED APPLICATION

This application is a divisional of application Ser. No. 09/363,914, filed Jul. 28, 1999, now abandoned.

BACKGROUND OF THE INVENTION

1. Field of the Invention

The invention is generally directed to surface covering products such as floor tile and floor covering sheets. More particularly, the present invention relates to a wearlayer surface covering in which the wearlayer is coated onto a substrate and initially is cured with low peak irradiance UV energy and thereafter further cured with high peak irradiance to form a low gloss wearlayer surface coating.

2. Description of the Related Art

Cured coatings such as floor wearlayer surfaces function to provide scratch resistance and durability to flooring. The durability encompasses both wear and tear properties, and wearability includes scratch resistance and gouge resistance. Further, the property of scratch resistance includes the ability to withstand both fine and deep scratches from soils and grit particles resulting from foot traffic. Additionally, the property of gouge resistance includes the ability of the coating and flooring to withstand damage from foot traffic in the form of heel damage or dent damage from objects striking the flooring.

For many of the decorative patterns in the flooring industry, the desirable coating is a wearlayer surface that has a glossy appearance. In other cases, low gloss is desirable for natural decorative patterns such as wood, slate or brick. A low gloss or matte coating is more preferable to give a "natural or real" appearance of the decorative layer. Accordingly, the gloss level of the coating must be specific for individual decorative patterns and therefore, it becomes a processing requirement to be able to control the gloss level of the coating for specific decorative patterns.

Furthermore, manufacturing differences in producing floor covering products may cause visible differences from batch to batch. Thus, in order to maintain a consistent gloss level throughout subsequent batches of floor covering products, gloss-level control must be addressed in the manufacturing process.

A prior art approach to obtaining low gloss coatings typically requires multiple ultraviolet (UV) medium pressure-mercury vapor lamps to cure a gloss-forming coating on the flooring material. The UV lamps typically have a long wavelength and a short wavelength output. To match the UV output of these sources, photoinitiators can be used to absorb UV light above 300 nm and below 300 nm. Microwave UV source lamps that exhibit characteristic spectral distributions above 300 nm, however, are more costly than standard medium pressure-mercury vapor lamps. Additionally, some of these photoinitiators (commonly referred to as phosphine oxides) are costly, and in many instances, have the problem of leaving an undesirable yellow color to cured final product.

U.S. Pat. No. 4,313,969 discloses a method to prepare low gloss or gloss controlled radiation coating by utilizing a two stage process. The first stage of the method involves UV cure of the resin material utilizing long wavelength UV spectral output where no substantial spectral distribution exists below 300 nm. The second stage of the method involves the curing the resin under a source comprised of short wave radiation where substantial spectral intensity is below 300 nm.

U.S. Pat. No. 5,585,415 teaches a method of preparing a low gloss coating by utilizing a three stage process including the steps of: (1) passing the coated substrate under ionizing radiation from an electron beam; (2) passing the coated substrate under UV lamps under an oxygen-containing atmosphere; and (3) passing the substrate under UV lamps in an inert atmosphere. The '415 patent discloses the use of a pigmented resin material that contains a phosphine oxide photoinitiator to provide a thorough curing.

U.S. Pat. No. 4,048,036 teaches a method to prepare low gloss coatings derived from a resin composition containing a flatting agent and air cure promoter, disclosed as benzophenone, and a second photoinitiator. The resin material is exposed to UV lamps in a high oxygen atmosphere to provide a wet surface and a partially cured, or "gel," state followed by exposure to UV lamps in a low-oxygen atmosphere to fully cure the coating.

SUMMARY OF THE INVENTION

The present invention is based on a composition and method of making a surface covering product, and preferably a floor covering product, in which the composition is selectively curable to either a high or low gloss wearlayer. The gloss is controlled by the use of low peak irradiance UV energy under an atmosphere of ambient air, followed by exposure to high peak irradiance UV light, preferably under an inert atmosphere comprised of nitrogen. The inventive composition contains a conventional flatting agent to lower gloss and/or hard particulates to improve abrasion resistance of the final surface wearlayer.

In the preferred embodiment, gloss levels for the same composition can be controlled by varying UV peak irradiance. The level of peak irradiance for a given coating composition enables specific process parameters to control gloss level. The peak irradiance of the initial UV exposure can be changed, for example by varying the distance between the source and substrate, or alternately, by changing input power for the UV source.

In the preferred process of making the surface covering, the gloss controlled wearlayer composition is formed from an acrylated aromatic polyester in the presence of multi-functional acrylates and a flatting agent and/or hard particulate materials. Partial polymerization is catalyzed by low peak irradiance UV radiation to gel the coating to form a low gloss wearlayer surface. Further polymerization is catalyzed by either high peak irradiance UV radiation, or alternately, by low energy electron beam radiation. The gloss controlled decorative wearlayer surface exhibits many performance properties sought in a flooring material.

Therefore, an object of the present invention is to provide a process of making a UV curable composition capable of producing high, medium and low gloss on surface covering products from the same composition, and a surface covering product resulting from this process.

Another object of the present invention is to provide a process to produce a variable gloss wearlayer surface on a floor covering product that does not require the usage of both long and short wavelength irradiation to control the gloss level.

A further object of the present invention is to provide a process of making a differential gloss product comprised of a discontinuous controlled gloss layer or a continuous controlled gloss layer.

Another object of the invention is to provide a flooring product including a high gloss and low gloss wearlayer surface.

Other objects, features, and advantages of the present invention will become apparent after review of the hereinafter set forth Brief Description of the Drawing, Detailed Description of the Invention, and the Claims.

DETAILED DESCRIPTION OF THE INVENTION

Figure 1:
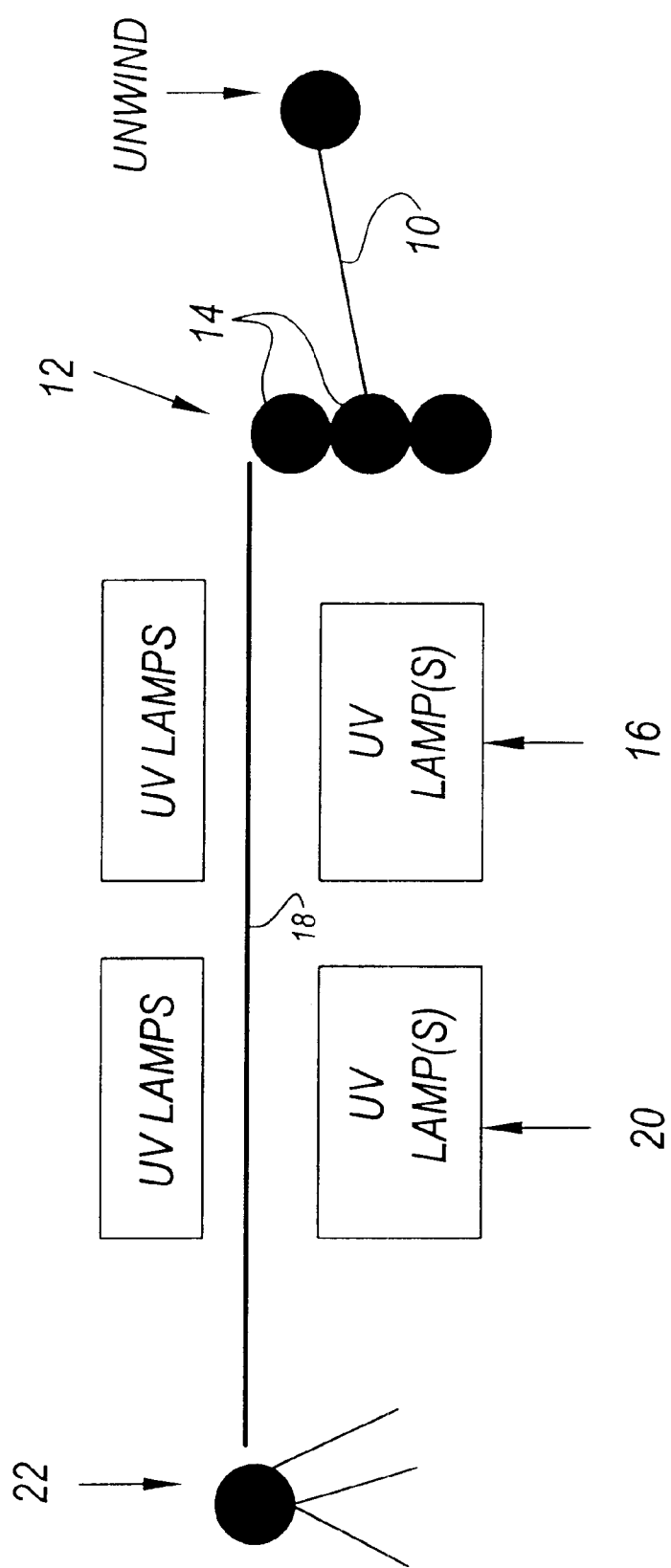
FIG. 1 is a schematic illustration of the preferred process for manufacturing a floor covering product with a gloss controlled abrasion resistant radiation curable coating.

Referring now in detail to the drawing, FIG. 1 illustrates the preferred process of manufacturing a surface covering product having a gloss controlled, abrasion resistant curable coating. Here, the preferred surface covering is floor covering products, such as floor sheets and tiles. Nonetheless, the present inventive composition and method can provide a gloss controlled surface coating on other surface covering products, such as countertops. The preferred floor covering comprises a support layer 10, or substrate, which contains decorative elements including color printing, applied particulates, chemical and mechanical embossing (not shown), and a clear coat (which can also be mechanically embossed) that is coated by an applicator device with the present inventive composition as further described herein. The method of coating application preferably is an air knife coater 12, but can alternately be a wire wound rod, three roll coater or a dead two roll coater, all known in the art. However embodied, the rolls 14 are kept warm enough to maintain the composition viscosity to allow for improved flow characteristics to eliminate coating defects commonly observed for high viscosity coatings. The composition is typically preheated in a reservoir. The coated decorative flooring material is moved along a process line preferably by a conveyor which is comprised of a belt and rollers.

The method of the present invention is based on the observation that substantial gloss reduction can be obtained if the preferred composition is UV irradiated with the same type of mercury lamp source(s) having a UV spectrum 200–400 nm, shown as a plurality of mercury lamps 16 if the peak irradiance of the lamp source(s) sufficiently is lowered. In contrast, the conventional prior art method for curing the resin material is to irradiate the coated material with a dose of UV radiation having a spectral distribution across the entire UV spectrum 200–400 nm, as commonly observed for mercury vapor lamps. This process, as cited in U.S. Pat. No. 4,313,969, results in a glossy coating. As used herein, gloss level is measured at 60°, as is known in the art and a high gloss level is a measurement of 70 or above and low gloss is a measurement of 50 or below.

In the second step of the preferred method of curing the composition, the partially cured coating 18 is then exposed to high peak intensity from the same type of a conventional medium pressure mercury vapor lamp source having a spectral output over the entire UV range 200–400 nm. The second UV source 20 is shown herein preferably as four mercury vapor UV lamps. The high peak intensity, however, is the most important factor in this method, rather than a particular number of lamps.

The preferred composition used in this invention, after proper curing, must exhibit performance properties sought in floor coverings. Floor covering properties include good stain resistance and gloss retention as well as sufficient toughness to resist gouging from foot traffic and abrasion resistance to survive continued wear. Although other flatting or hard particle agents may be used as is known in the art, silica is the preferred "flatting" agent to reduce the gloss level of the cured coating. Further, wear resistant fillers preferably are included in the composition and aluminum oxide in all forms to include calcine, crystalline, precipitated, semi and micro crystalline, and amorphous, is the preferred wear resistant filler added, which provides enhanced scratch resistance of the final product after curing of the wearlayer. Other wear resistant fillers as known in the art, however, are alternately used.

The preferred composition further includes polyesters, which include those described in the reference patents. When this composition is formulated with an appropriate diluent package and other additives, including the hard particle fillers as described above, it exhibits wear and stain resistance properties similar to, and in some cases superior to, the referenced materials. The preferred composition also preferably includes urethane acrylate materials, which are not to be limited to those described in the examples set forth in this invention disclosure, but include any materials derived from aliphatic or aromatic diisocyanates, when the urethane acrylate materials give crosslink density and glass transition temperatures in the appropriate range for floor wear surface as described herein.

In the present invention, it is important to note that floor coverings also must particularly display a flexibility once cured onto the flooring material, to allow for roll windup onto a small diameter core, shown as wind up 22. A coating that exhibits low elongation can result in the formation of across-machine direction fractures once the composition film is wound. Furthermore, the coating on the rigid decorative film must have sufficient elongation to withstand stretching associated with embossing the surface of the film.

An example of a coating composition pursuant to the present invention, although not to be solely limited to polyurethane and polyester floor covering, is the following composition:

I. An acrylic polyester (I) comprising of hydroxy and acryl functionality's derived from:
   A. A hydroxy terminated aromatic polyester formed from the reaction product of a polycarboxylic acid and excess diol; and
   B. Acrylic acid Resin material I is mixed with mono, di, or trifunctional acrylates to form the initial resin composition.

The final floor covering coating composition is then prepared by addition of:

II. C. a flatting agent such as silicon dioxide;
   D. a hard particulate such as aluminum oxide (any form), spinel, aluminum phosphate, silica, titanium; diamond, boron nitride, and other particulates as known in the art; and/or
   E. other additives which preferably include
     (i) Free radical generators, such as photoinitiators, that cleave upon exposure to UV radiation to form radicals that initiate polymerization of the coating composition, including but not limited to, acylphosphine oxides, acetophenone derivatives, and benzophenone-type materials;

(ii) Surfactants that provide good leveling and flow characteristics of the applied wet coating; and (iii) UV absorbents that help prevent discoloration of the coating and/or flooring structure upon exposure to UV radiation in the form of sunlight.

As discussed above, the second step of the current inventive method is partially curing the composition on the surface covering product through exposure to low intensity UV radiation, shown as UV source 16, in such a fashion as to not to degrade or yellow the PVC or non-vinyl composition rigid film or flooring material support layer and alter the appearance of the decorative layer. Thus, the use of the preferred composition at the step of partially curing the composition polymerizes the ethylenically unsaturated groups within the composition from a liquid to a "gel" and results in a low gloss consistensy. Such low gloss is apparent to the naked eye when light is reflected from a micro roughened surface in a diffuse manner. The micro-roughened surface is accordingly achieved by use of a flatting agent such as silica. And further, in accord with the current invention, gloss level is controlled by UVA peak irradiance, dosage, and free radical generator (photoinitiator) type and level in the composition. Thus, the partially cured film and the low gloss wearlayer surface is then further cured by utilizing high intensity UV radiation, shown as UV source 20, whereby a high gloss level can be achieved, as further illustrated in FIG. 2. The low gloss appearance of the cured product is consequently predetermined from this process.

Examples of the Preferred Embodiments of the Coating Compositions

An example of an acrylated Polyester 1, as described in U.S. Pat. No. 5,663,003, Example 2, for the coating acceptable for the present invention is a hydroxy terminated polyester (polyester polyol) which was from the following charge in a 2 Liter flask:

| | |
|---|---|
| Trimellitic anhydride | 889 g |
| 1,6-Hexanediol | 234.5 g |
| Phthalic Anhydride | 376.5 g |
| Phosphorous Acid | 0.55 g |

The flask was equipped with a mantle, stirrer, thermometer, temperature controller, gas inlet tube, and an upright condenser. The condenser was steam heated and packed with glass helices and had a thermometer on top. The still led to a water cooled condenser that drained into a graduated cylinder.

The batch was heated to 220° C. under a trickle of nitrogen (0.5 SCFH) and water of esterification was collected and measured in a graduated cylinder. The reaction mixture was held at 220° C. until the acid number had fallen to below 5. This took about 8 hours during which time the water from the esterifications reaction was collected. The final product had an Acid No. of 3.3 and a Hydroxyl No. of 207. It therefore had a hydroxy equivalent weight of 271 an estimated number average molecular weight of 880.

The prepared polyester was acrylated as follows: the materials below were introduced into a 2000 ml flask equipped with a mantle, stirrer, thermometer, gas inlet tube, dropping funnel, and Barrett Trap with a water cooled condenser on top;

| | |
|---|---|
| Heptane | 200 ml |
| Polyester | 800 g |
| Acrylic Acid | 277 g |
| Monomethyl ether of hydroquinone | 0.12 g |
| P-Toluenesulfonic acid | 5.4 g |
| Phosphorus Acid | 0.62 g |
| Hydroquinone | 0.12 g |
| N-methyldiethanolamine | 3.4 g |

The trap was filled to the overflow with heptane. With a dry air flow of 0.2 SCFH, the ingredients were heated to reflux at 98° C. to 105° C. while stirring vigorously and collecting water and displacing heptane in the trap. Heptane was added through the dropping funnel as required to maintain reflux at 100–105° C. After 4 hours of reflux, approximately 65 mL of aqueous distillate had collected. All "water" and heptane were withdrawn from the trap and the dry air flow was increased to 2 SCFH. Prior to stripping off the heptane, 3.4 g of N-Methyldiethanolamine (MDEA) was added. When distillation stopped, additional "heptane" had collected in the trap. The batch was cooled to 50° C. with a trickle of dry air. The Acid Number of the product was 34.

Thus the following compositions were made:

Coating Composition 1

A polyester surface covering composition was prepared from:

| | |
|---|---|
| Acrylated polyester | 750 g |
| Highly ethoxylated triacrylate SR9035 | 250 g |
| Benzophenone photoinitiator | 10 g |
| Irgacure 184 photoinitiator | 2.5 g |
| Surfactant Dow Corning 193 | 2.5 g |

Coating Composition 2

To coating Composition 1 was added 4% by weight of surface treated silica from Degussa as OK412. The mixture was blended using a Cowles type blade.

Coating Composition 3

To coating Composition 2 was added 5% weight calcined aluminum oxide obtained from Norton company having an average particle size of 30 μms. The mixture was blended using a Cowles type blade.

A multifunctional polyurethane (methyl acrylate oligomer) coating composition was prepared from Example 1 in U.S. Pat. No. 5,843,576.

A further example of a hydroxy terminated polyester, Polyester 2, was prepared in an identical fashion to that described for Polyester 1 with the following charge weights:

| | |
|---|---|
| 1,6 Hexanediol | 992.7 g |
| Glycerine | 133.5 g |
| Phthalic Anhydride | 1071 g |
| Dibutyltin Dilaurate | 0.5 g |

The reaction mixture was cooled and total amount of water collected was 135 grams. The final product gave an Acid No. of 2.4 and a Hydroxyl No of 179. It thus had a hydroxyl equivalent weight of 316.

Coating Composition 4

A polyurethane wearlayer forming composition was prepared from the following charge in a 2 Liter flask equipped with heating mantel, stirrer, and dry air purge at 0.25 SCFH:

| | |
|---|---|
| Tone M-100, Hydroxyacrylate from Union carbide | 126 g |
| Monomer mixture (27.5% by wt Sartomer SR499, 27.5% by wt Sartomer SR502, 45% by wt Sartomer SR351) | 139 g |
| Polyester 2 | 34 g |

This mixture was heated to 100° F. The following was added:

| | |
|---|---|
| Desmodur N-3300, Bayer's isocyanurate trimer | 87 g |

This mixture was heated to 185° F. (85° C.) and maintained at this temperature for five hours. The mixture was cooled and to the flasks was added:

| | |
|---|---|
| Benzophenone | 11.7 |
| Surfactant Dow Corning 193 | 1 g |

An infrared spectrum confirmed that all of the NCO groups had reacted. To this mixture was added 48 grams of calcined aluminum oxide (30 microns) and 34 grams of the silica flatting agent Degussa OK412. This mixture was blended using a Cowles type blade. The final mixture was deaerated.

EXAMPLE 1

Example 1 illustrates that high, medium and low gloss surface wearlayer can be obtained from the same coating by changing the UVA Peak Irradiance. Coating Composition 2 was pre-heated to 130° F. to reduce the viscosity and applied onto a decorative flooring structure which is comprised of a support layer containing decorative elements including color printing, applied particulates, and a clear coat that is embossed, via a roll coater. Excess coating was removed by a heated air knife (shown as coater 12) to give a coating thickness of approximately 0.6 mils. The coated decorative flooring material, preheated to approximately 100° F. is directed through an apparatus which includes along a process line by a conveyor which is comprised of at least, two UV sources, a belt and rollers. The coated flooring material is partially cured by exposing it to low UV Peak irradiance from a UV source having a spectral distribution across the entire UV spectrum 200–400 nm as commonly observed for mercury vapor lamps shown as UV source 16. The distance of the lamp to substrate was approximately 5 inches. The partial curing process is preferably carried out under an atmosphere of air which results in a low gloss, slightly tacking surface.

The partially cured coating is then further cured by being exposed to high peak irradiance from preferably the same type of conventional medium pressure mercury vapor lamp having a spectral output over the entire UV range 200–400 nm shown as UV source 20. This process is preferably carried out under an inert atmosphere of nitrogen substantially free of oxygen.

The preferred manner of achieving controlled gloss is by varying UVA Peak irradiance of the first UV source to achieve the desired gloss level. At 15 fpm, the peak UVA irradiance was varied from about 612 mW/cm$^2$ to 934 mW/cm$^2$ for the UV source 20 as illustrated in FIG. 1. Curing Composition 1 under these various UVA peak irradiance in the first step resulted in various gloss levels (60 degree gloss measurements) ranging from 14 to 50 for the cured wearlayer surface as illustrated in Table 1.

TABLE 1

UVA Peak Intensity vs. Gloss

| Peak Intensity (mW/cm$^2$) | 60 deg Gloss Measurement in flat areas |
|---|---|
| 612 | 14 |
| 742 | 31 |
| 893 | 46 |
| 934 | 50 |

EXAMPLE 2

Example 2 illustrates that high gloss can be obtained from the same coating composition. Coating composition 2 was processed in a similar fashion to that described in Example 1 except that four high intensity 200 W/in$^2$ UV light sources were used to cure the coating composition in the UV source 16 under an inert, nitrogen atmosphere substantially free of oxygen, in contrast to the oxygen containing atmosphere of Example 1. The total energy was approximately 2J/cm$^2$. The final coated wearlayer surface was found to have a high gloss of 74 (60 degree gloss measurement).

EXAMPLE 3

Example 3 illustrates that high, medium and low gloss surface wearlayer can be obtained from the same coating composition at an elevated coating temperature (lower viscosity) prior to partial cure by changing the UVA Peak Irradiance. Further, this example teaches that gloss control can be achieved on either side of the intensity/gloss minimum.

Figure 2:
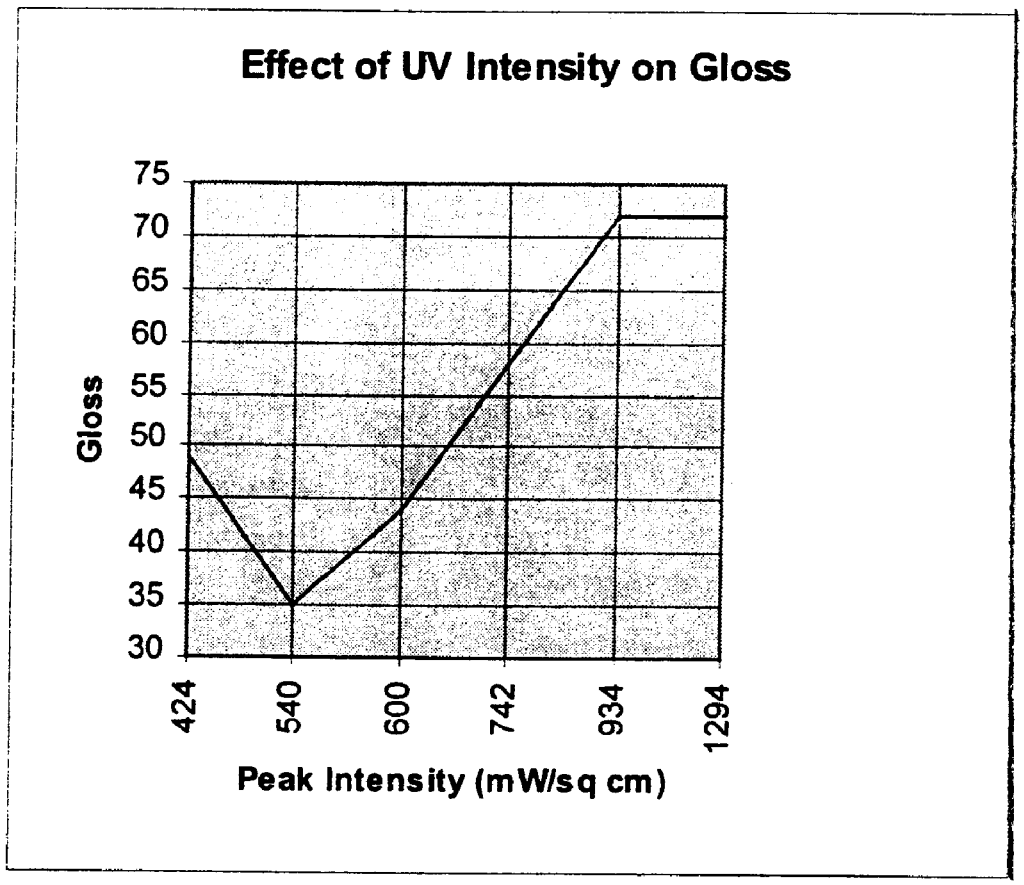
FIG. 2 is a graph representing the effect of UV intensity on gloss level yielded from the cured composition.

Composition 2 was processed as in Example 1. The final thickness of the coating from composition 2 was approximately 1 mil. At 15 fpm, the UVA irradiance was varied from 424 mW/cm$^2$ to 1294 mW/cm$^2$ for the UV source 20 as illustrated in FIG. 2. Curing Composition 2 under these various UVA peak irradiance in the first step at a precure coating temperature of 137° F. resulted in various gloss levels (60 degree gloss measurements) ranging from 35 to 72. Hence, gloss of the present invention can be adjusted on both sides of the intensity/gloss level minimum, shown graphically in FIG. 2. Minimum gloss is achieved at 540 W/cm$^2$. At 424 mW/cm$^2$ the gloss level of 49 is higher than the minimum. Increasing the intensity above 540 mW/cm$^2$ results in an increase in gloss, reaching a value of 73 at 934 mW/cm$^2$.

EXAMPLES 3–5

Examples 3–5 illustrate that abrasion resistant variable gloss wearlayer surfaces can be prepared by incorporation of aluminum oxide particles into the resin material.

Example 3 was Composition 1 processed in an identical fashion to Example 2. The final thickness of the wearlayer surface from composition 1 was approximately 1 mil.

Example 4 was Composition 3 processed in an identical fashion to Example 2 to give a high gloss wearlayer surface having a thickness of approximately 1 mil.

Example 5 was Composition 3 processed in an identical fashion to that described in Example 1 where the UV source 16 had an adjusted peak irradiance of 540 mW/cm² under an atmosphere of air. Under these conditions, a low gloss wearlayer surface was produced having a gloss level of about 32 (60 degree gloss measurement in embossed areas of the decorative flooring material).

All samples were then evaluated by a modified Gardner abrasion tester using 180 grit sandpaper. After 100 cycles (back and forth is one cycle), gloss retention was calculated by dividing the final gloss measurement by the initial gloss measurement before testing and multiplying by 100. As set forth in Table 2, in comparing Example 3 to Example 4, the incorporation of aluminum oxide significantly improves abrasions resistance as noted in Example 4. The low gloss wearlayer surface prepared from Composition 3 in Example 5 by the current invention also displays improved abrasion resistance versus Composition 1 in Example 3.

TABLE 2

|  | Example 3 | Example 4 | Example 5 |
|---|---|---|---|
| Coating Composition | 1 | 3 | 3 |
| Aluminum Oxide (approximately 30 μm in dia.) | None | Yes | Yes |
| Peak Intensity Lamp 1(mW/cm²) | N/A | N/A | 540 |
| Initial 60 deg Gloss (embossed) | 74 | 63 | 32 |
| Abrasion gloss retained (%) | 48 | 89 | 88 |

EXAMPLES 6–8

Examples 6–8 illustrate the advantages of various types of flatting agents which are particularly useful for this invention. As set forth in Table 3, all flatting agents evaluated, e.g. silica, urea formaldehyde, were found to affect the gloss level in a similar fashion. To Composition 1 was added 4% by weight of the flatting agent and the mixture blended using a Cowles type blade. A No. 3 wire-wound rod was used to achieve a 1 mil coating on flat flooring material. The samples were processed in an identical fashion to that described in Example 1, except that two 200 W/in² low peak irradiance lamps (ca. 350 mW/cm²) were used for UV source 16 under air atmosphere. The final cure was accomplished by use of two high peak irradiance 200 W/in² UV lamps for UV source 20 under an atmosphere of nitrogen. The total cure energy for these samples was approximately 1.7 J/cm².

TABLE 3

Effect of Flatting Agent on Gloss

|  | Example 6 | Example 7 | Example 8 |
|---|---|---|---|
| Coating Composition | 1 | 1 | 1 |
| Degussa OK412 silica | 4% wt | None | None |
| Crossfield UV70C silica | None | 4% wt | None |
| Pergopak; urea formaldehyde | None | None | 4% wt |
| Peak intensity Lamps 1 & 2 (mW/cm²) | About 350 | About 350 | About 350 |
| Initial 60 deg Gloss (embossed) | 26 | 26 | 10 |

EXAMPLE 9

Example 9 illustrates that a differential gloss product can be made by using the inventive process.

Composition 2 was applied onto an embossed flooring material via a #10 wirewound rod. The coated substrate was pre-heated to 130° F. and partially cured by exposing it to low UV peak irradiance from the UV source 16 in air. The distance of the lamp housing to the substrate was approximately 7 inches. The UV peak irradiance was 540 mW/cm². Composition 2 was coated to the partially cured coating discontinuously onto the tops of the embossed surface in the same Composition 2. The partially cured coating Composition 2 and non-cured Composition 2 was cured by exposing the sample to high peak irradiance. Curing under these conditions gave a differential gloss product having a low gloss level, about 30, in the grout areas of the embossing structure and high gloss, about 80, on the tops of the embossed areas.

The present inventive method therefore provides a surface covering product which can have gloss control with a single composition applied. Moreover, the same composition can be differently cured on the same surface covering product such that the same surface covering product, e.g. a floor tile, can have areas of differential gloss from altering the method of curing, as opposed to modifying or changing the composition. Accordingly, once the composition is coated onto the substrate comprising surface covering product, the gloss level of the final cured product can be gloss-controlled for the full or partial coated areas of the surface covering product.

EXAMPLE 10

Example 10 illustrates that a high, medium and low gloss surface wearlayer can be obtained from the polyurethane acrylate based oligomer Composition 4 by changing the UVA Peak Irradiance. Coating Composition 4, a polyurethane coating, was pre-heated to 100° F. to reduce the viscosity and applied onto a decorative tile structure, which is comprised of a rigid vinyl film and tile base, preferably with a 2 mil birdblade. The coated decorative tile structure was preheated in an oven to approximately 150° F. and is directed through an apparatus which includes along a process line by a conveyor which is comprised of a UV sources, a belt and rollers. The coated tile structure is partially cured by exposing it to low UV Peak irradiance from a UV source having a spectral distribution across the entire UV spectrum 200–400 nm as commonly observed for mercury vapor lamps. The distance of the lamp to substrate was approximately 10 inches. The partial curing process is preferably carried out under an atmosphere of air which results in a low gloss, slightly tacking surface. The partially cured coating Composition 4 was cured by exposing the sample to high peak irradiance At 10 fpm, the peak UVA irradiance was varied from about 87 mW/cm² to 191 mW/cm² for the UV source 20 as illustrated in FIG. 1. Curing Composition 4 under these various UVA peak irradiance in the first step resulted in various gloss levels (60 degree gloss measurements) ranging from 21 to 74 for the cured wearlayer surface as illustrated in Table 4.

TABLE 4

UVA Peak Intensity vs. Gloss

| Peak Intensity (mW/cm²) | 60 deg Gloss Measurement |
|---|---|
| 87 | 21 |
| 133 | 60 |
| 191 | 74 |

While there has been shown a preferred and alternate embodiment of the present invention, it is to be understood that certain changes may be made in the form and arrangement of the parts without departing from the underlying spirit and scope of the invention as set forth in the claims appended herewith.

What is claimed is:

1. A method of manufacturing a surface covering product having a differential gloss controlled wear layer, comprising the steps of:
    coating a substrate with a first layer of an ultraviolet radiation curable coating composition comprised of:
        a ultraviolet curable, oxygen inhibited, unsaturated resin composition,
        a flatting agent;
        at least one radiation activated, free-radical generating photoinitiator, and
        optionally, a hard particulate material;
    partially curing the first layer by irradiating the coated substrate with a first peak irradiance ultraviolet radiation having a spectral distribution from 200 nm to 400 nm in the presence of oxygen to form a coated surface region;
    applying a second layer of the ultraviolet radiation curable coating composition over at least a portion of the surface region; and
    further curing the partially cured first layer and curing the second layer by irradiating the partially cured and coated substrate with a second peak irradiance ultraviolet radiation having an irradiance higher than the first peak irradiance and having a spectral distribution from 200 nm to 400 nm in an inert atmosphere to form a surface region having at least two different gloss levels.

2. The method of claim 1, wherein the coating composition of the second layer comprises hard particulate material.

3. The method of claim 1, wherein the coating compositions of the first and second layers comprise substantially the same amount of flatting agent.

4. The method of claim 1, wherein the ultraviolet radiation curable, oxygen inhibited, unsaturated resin comprises an acrylated polymer and an ethoxylated polyfunctional acrylate.

5. The method of claim 1, wherein the acrylated polymer is an aromatic polyester.

6. The method of claim 1, wherein the substrate is flooring material.

7. A method of manufacturing a surface covering having a wear layer, the method comprising the steps of:
    coating a substrate with a radiation curable coating composition comprising an ultraviolet radiation curable, oxygen inhibited, unsaturated resin composition and a flatting agent;
    selecting a desired gloss level;
    determining a first peak irradiance required to achieve the desired gloss level, wherein the peak irradiance is determined from a generated gloss level versus peak irradiance analysis for the curable coating composition, wherein increasing peak irradiance results in increased gloss; and
    irradiating the coating composition in oxygen with the peak irradiance to partially cure the coating composition and to achieve the desired gloss level.

8. The method of claim 7, wherein the method further comprises exposing the partially cured coating composition to a second peak irradiance to cure the coating composition.

9. The method of claim 8, wherein the coating composition is cured under an inert atmosphere.

10. The method of claim 8, wherein the second peak irradiance is greater than the first peak irradiance.

11. The method of claim 8, wherein the curing is done with ultraviolet radiation having a spectral distribution from 200 nm to 400 nm.

12. The method of claim 7, wherein the partial curing is done with ultraviolet radiation having a spectra distribution from 200 nm to 400 nm.

13. The method of claim 7, wherein the flatting is a silica flatting agent present at up to about 10% by weight of the curable coating composition.

14. The method of claim 7, wherein the hard particulate materials are aluminum oxide particles having a diameter between about 1 $\mu$m to about 50 $\mu$m in diameter and being present in the coating composition at up to about 25% by weight of the curable coating composition.

15. The method of claim 14, wherein the aluminum oxide particles have a diameter between about 10 $\mu$m to about 40 $\mu$m in diameter and are present in the coating composition up to about 15% by weight of the curable coating composition.

* * * * *